July 2, 1963

A. B. EDMUNDS, JR
MECHANICALLY DRIVEN ELECTRICAL
RECORDING SPHYGMOMANOMETER 3,095,873

Filed March 27, 1961

INVENTOR.
ARTHUR B. EDMUNDS JR.

BY
Reynolds & Christensen

ATTORNEYS

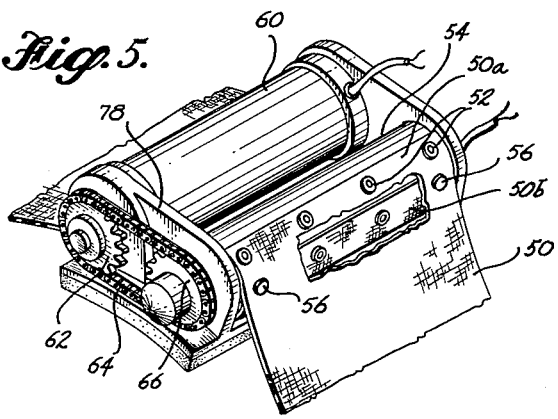
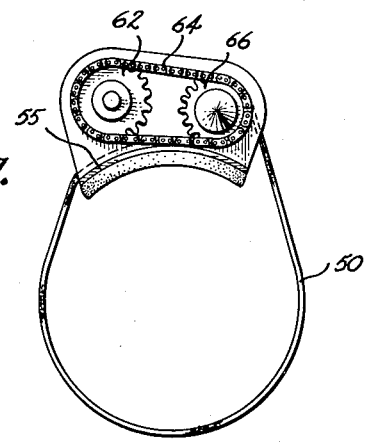
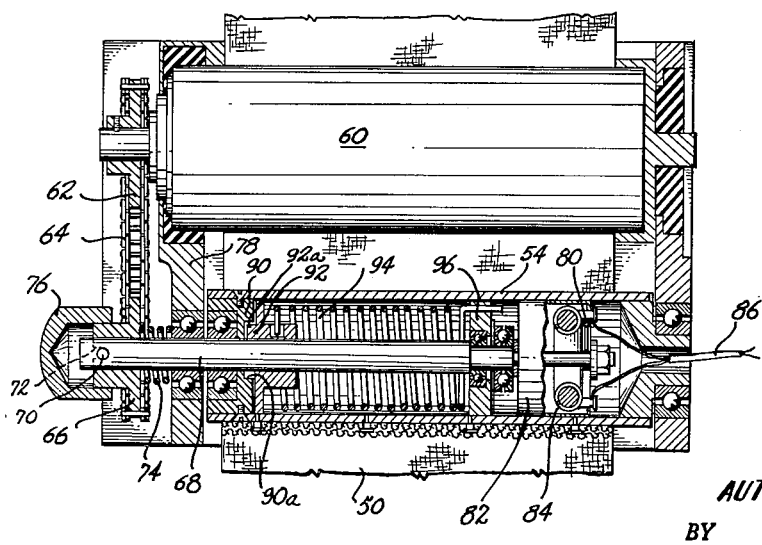
INVENTOR.
AUTHUR B. EDMUNDS JR.
BY
ATTORNEYS

United States Patent Office 3,095,873
Patented July 2, 1963

3,095,873
MECHANICALLY DRIVEN ELECTRICAL RECORDING SPHYGMOMANOMETER
Arthur B. Edmunds, Jr., Seattle, Wash., assignor to Boeing Airplane Company, Seattle, Wash., a corporation of Delaware
Filed Mar. 27, 1961, Ser. No. 98,567
7 Claims. (Cl. 128—2.05)

This invention relates to improvements in sphygmomanometric and sphygmometric devices; and more specifically concerns a novel mechanically and electrically operated instrument of this type. The invention is herein illustratively described by reference to the presently preferred embodiment thereof; however, it will be recognized that certain changes and modifications therein with respect to details may be made without departing from the essential features involved.

A principal object is to provide a reliable, highly compact and portable device of this nature. One specialized application for the invention is as one of a group of physiological instruments to be worn by an astronaut during a space flight or simulated space flight test. In such a case compactness, lightness of weight, reliability, low power consumption, and in some instances, fully automatic operation are important.

A further object is to provide a sphygmomanometric device having a compact and self-activating occlusion cuff mechanism.

Another object is to provide a system of the described type with means to record pulse beat characteristics, the relative systolic and diastolic points during a cuff tensioning and slackening cycle, and cuff strain, hence systolic and diastolic pressures. A related object is to devise such a system wherein repeated recordings of these data may be made automatically and at regular or predetermined intervals as desired.

As herein illustrated in one form the novel apparatus comprises an occlusion cuff device wherein the ends of the cuff band are adapted to be drawn together or separated by means of a reversible electric motor drive mechanism having coacting parts mounted upon and interconnecting such ends. A strain gauge on the cuff measures cuff tension, hence blood pressure. Motor energization and reversal may be controlled manually, but preferably is programmed automatically in accordance with the operation of a control system including an interval timer and means to sense predetermined maximum and minimum strain conditions in the cuff. Recording of varying cuff tension (strain gauge signal) and simultaneously of pulse beat during progressive slackening of cuff tension through the relative systolic and diastolic points, yields a record from which pulse strength and blood pressure ratio can readily be determined. In another illustrative embodiment the cuff is tightened through a coupling drive spring deflection of which is measured by a potentiometer as a measure of cuff tension.

These and other features, objects and advantages of the invention will become more fully evident as the description proceeds by reference to the accompanying drawings.

FIGURE 5 is a perspective view of a different embodiment with a portion of the cuff band removed for convenience of illustration.

FIGURE 6 is a top view of the same at a larger scale and with parts sectioned to show certain details.

FIGURE 7 is an end view of the modified embodiment.

Figure 1:
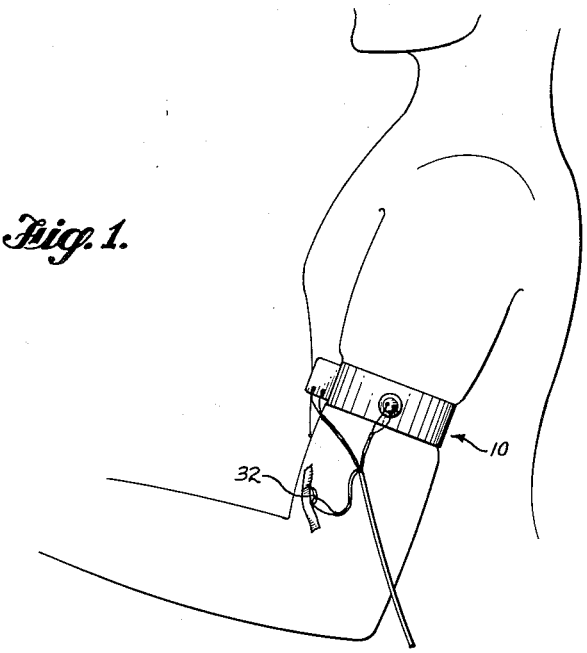
FIGURE 1 is a simplified side view of occlusion and detection apparatus according to the invention.
Figure 2:
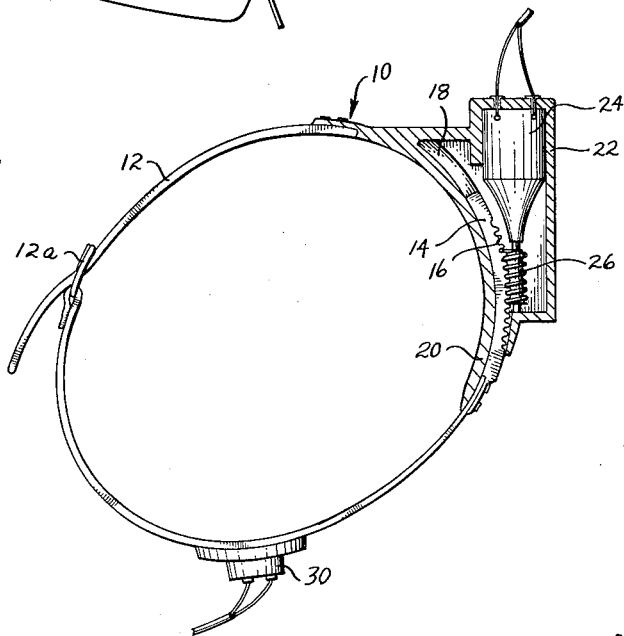
FIGURE 2 is an end view of the occlusion cuff device.
Figure 3:
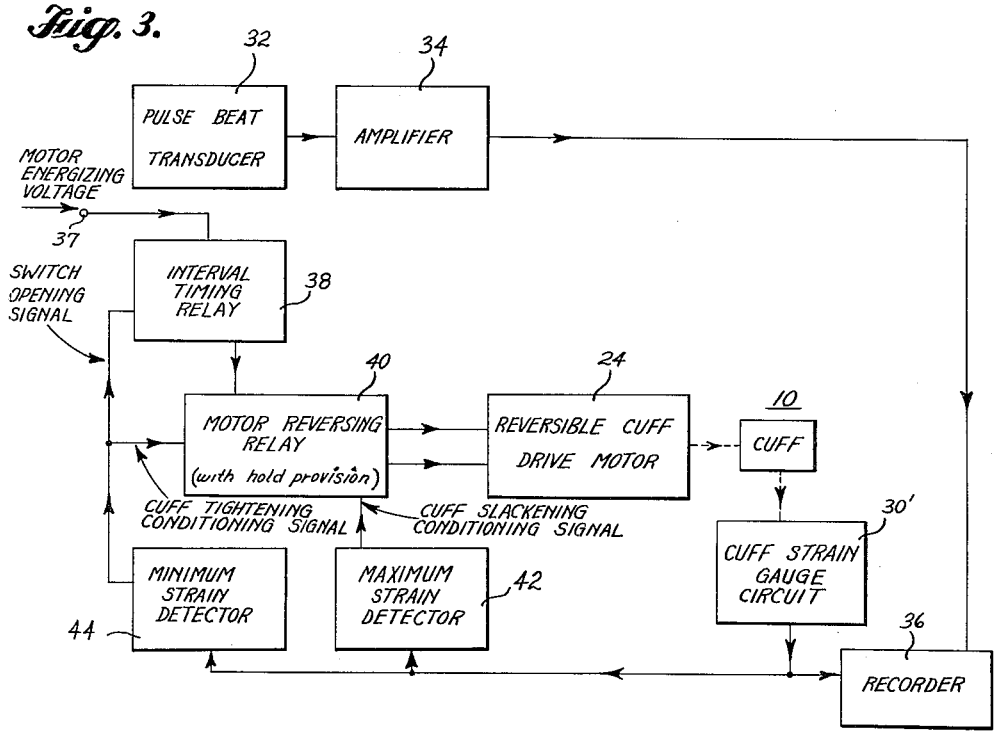
FIGURE 3 is a block diagram of a system for programmed operation.

The occlusion cuff device 10 illustrated in FIGURES 1 to 3 comprises an arm encircling strap 12 having on one end 14 an arcuately formed rack gear 16 guided for endwise circumferential movement in the arcuate guide or track 18 formed in its opposite end 20. Such opposite end carries a mounting bracket 22 for a reversible electric motor 24, and a worm gear 26 connected to be driven by such motor. This worm gear which comprises a drive connection mounted in fixed relation to the arcuate guide 18 and thereby to the rack gear 16, meshes continuously with the latter so as to tighten or slacken the cuff as the motor is energized to drive in one direction or the other. The band may be made of any suitable material including metal or plastic and should be flexible to a degree conforming it to the subject's arm. The guide 18 and the rack gear 16 should be form retentive, however, in order to maintain engagement with the worm and to provide stable support for the motor. A quick-disconnect adjustable coupling 12a may be provided in the band, if desired, for ease of application and removal and of appropriately adjusting the cuff to match girth of the arm.

A strain gauge 30 is mounted on the band to detect strain in the band and produce an electrical signal proportional thereto. The design characteristics of the band in terms of strain as a function of the applied forces are, of course, related to the design characteristics of the strain gauge 30.

A pulse beat transducer or detector 32, such as a piezoelectric crystal or acoustical detector is or may be applied to the arm artery below the occlusion point so as to detect pulse beat and the absence thereof, and to produce an electrical signal proportional to pulse beat pressure.

Figure 4:
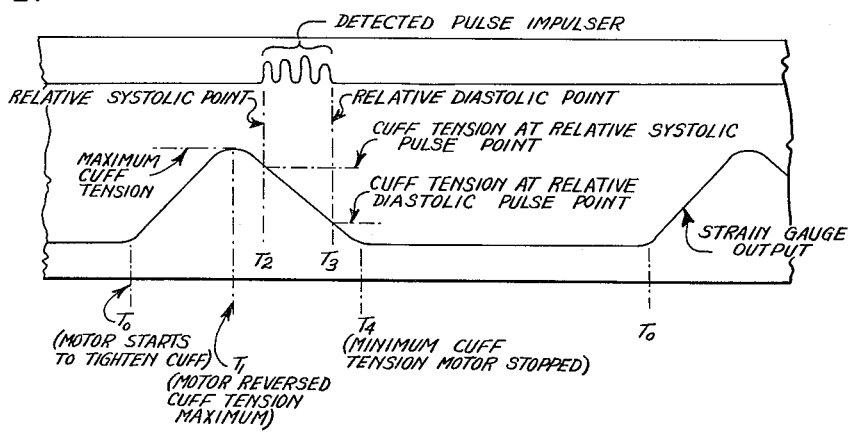
FIGURE 4 shows a typical section of time-base graphic record produced with the system of FIGURE 3.

Referring to FIGURES 3 and 4, the pulse beat transducer signal is increased in amplitude by amplifier 34 for application to a suitable indicator such as a stylus actuator (not shown) of the recorder 36. The output of the strain gauge circuit 30' is also applied to the recorder, as to a separate stylus therein to record simultaneously with the pulse beat detector.

Motor energization voltage, derived from a separate supply source (not shown) such as a battery, is applied at terminal 37 and must pass through the contacts (normally open) of an interval timing relay 38, thence through selectively actuated contacts of a motor reversing relay 40 which is normally set to energize the motor in the direction for tensioning of the cuff. The interval timing relay is set to close its contacts at prescribed intervals, such as every minute, in order to produce a recording. When it does this the band is tightened. Motor energization polarity is reversed to start slackening the cuff when cuff tension exceeds the value necessary for occlusion in the test artery of the subject. This condition may be detected or, as in the illustrated case, an allowance may be made for it by reversing the motor when cuff tension reaches a predetermined value sufficient to assure that occlusion must have occurred. such is the function of the maximum strain detector 42 which actuates the reversing relay 40 in response to a strain gauge output signal corresponding to the desired maximum cuff tension. This detector 42 may comprise any suitable electronic response circuit capable of producing a switch reversing stimulus in response to an input signal above a predetermined value.

As the cuff is progressively slackened by reverse operation of motor 24 a point is reached when the artery ceases to be totally occluded. At this relative systolic point the rush of blood through the partial occlusion or restriction creates pressure and sound pulsations, either of which may be sensed by transducer 32. When finally the occlusion is reduced to zero the transducer signal ceases. This is the relative diastolic point. Drive motor operation continues thereafter sufficiently to slacken the cuff to substantially zero tension. Such condition is detected by the minimum strain detector 44, which in turn sends an impulse to the interval timing relay to open its contacts and deenergize the motor. A similar signal is also sent to the motor reversing relay 40 to reverse its condition preparatory to energizing the motor in the cuff-tensioning sense upon initiation of the next succeeding cycle of the interval timer 38.

These functions and conditions are shown in FIGURE 4 with reference to portions of a typical graphical record produced by recorder 36. Recorded strain gauge output, which may be calibrated in terms of blood pressure, at the relative systolic and diastolic points is represented as deviation from a base line in the graph. These points are readily located as the points of beginning and ending of the group of recorded pulse impulses. The frequency and amplitude of the latter also represent important test data to be interpreted along with the blood pressure measurement.

The recycling interval may be any selected value, as established by the interval timer.

In the alternative embodiment shown in FIGURES 5, 6 and 7 the cuff band 50 is formed by a length of band material one end 50a of which is secured by fasteners 52 to a driven wind-up drum 54 and the other end 50b of which is secured by snap fasteners 56 to the end 50a. From the end 50a which is secured to the drum 54 the band extends around the arm or other body member, thence over the arcuate base 55 of the motor drive unit, and around the underside of the wind-up drum 54 for interconnection of the ends 50a and 50b. Thus, when the drum 54 is turned by the motor unit 60 acting through the drive sprocket 62, the drive chain 64 and the driven sprocket 66, both ends of the cuff band are drawn in simultaneously. This insures uniform tightening of the band and avoids the tendency for the flesh and skin of the arm or other body member to be gathered or bunched due to unilateral application of force to the band.

The driven sprocket 66 is drivingly connected to the shaft 68 through a slot-and-pin releasable coupling comprising the transverse pin 70 mounted in the end of the shaft, and the slot 72 formed in the adjacent end of the flange of the sprocket 66, the sprocket being urged endwise of the shaft by a compression spring 74 which maintains the pin 70 normally seated in the slot 72. Disengagement of the slotted sprocket from the pin 70, to decouple the shaft from the drive, is effected by pressing inwardly on the release button 76 joined to the sprocket.

The shaft 68 is journaled in the end wall 78 forming part of the motor unit base, and in the wind-up drum 54. The end of the shaft opposite from the slotted end carries the wiper 80 of a potentiometer 82 whose winding 84 is rigid with the potentiometer housing which in turn is secured to the interior of the wind-up drum 54 so as to rotate with the drum. Thus, relative rotation between the drum 54 and the shaft 68 produces displacement of the potentiometer wiper along the potentiometer winding. The potentiometer winding leads 86 are shown. It is assumed that the wiper is or may be grounded to the frame which may have a separate electrical lead (not shown) connected to circuit apparatus with which the leads 86 are connected.

Coupling of the driven shaft 68 to the driven wind-up drum 54 occurs through a lost-motion device comprising opposing rotary members 90 and 92, the first of which is rigidly mounted on the drum 54 within one end thereof, and the other of which is rigidly mounted on the shaft 68 in a position to engage the member 90. Each of these members has shoulders elements 90a and 92a, respectively, formed thereon which mutually interfere in a certain opposite, angularly displaced relative rotative position of the members so as to cause the member 90 to rotate as the member 92 is rotated in one direction or the other when these relative positions are reached, and which permits rotation of the member 92 relative to the member 90 in an opposite direction through a predetermined lost-motion intermediate angle of relative rotation. Such coupling devices are or may be of conventional form. When the two members are interengaged to rotate conjointly, rotation of shaft 68 causes rotation of the drum 54 positively. In the opposite direction of rotation of the shaft, the member 92 rotates but it does not rotate with it the member 90. Instead it rotates against the reaction force of the helical spring 94 one end of which is connected to the member 92 and the opposite end of which is connected to the member 96 which is joined to the wind-up drum 54 so as to rotate with the drum. Thus, in this latter direction of rotation, the drum is rotated against the progressive deflection of the spring 94 to tighten the cuff. The tension in the spring represents tension in the occlusion cuff 50, and is proportional to spring deflection. Such deflection is measured by the relative displacement between the potentiometer wiper 80 and the winding 84, which in turn may be measured in a circuit device as in the preceeding embodiment. This direction of rotation causes the occlusion cuff to become tightened on the body member. Rotation in the opposite direction permits tension in the occlusion cuff to decrease progressively as the spring 94 recoils. Such recoil action of the spring is permitted gradually and progressively during the reverse direction of drive of the electric motor 60. When finally the spring is completely relaxed, further loosening of the occlusion cuff is permitted as the motor continues to rotate in the same direction through the lost-motion phase existing between the coupling devices 90 and 92. Thus the cuff may be easily removed by disengaging the coupling fasteners 52. Alternatively it may be immediately loosened by pressing the release button 76.

Different arm sizes and spring preloadings may be achieved by selecting different rows of fasteners 52 on the drum, there being additional rows beyond that shown.

These and other aspects of the invention will be recognized from this disclosure by those skilled in the art of electrical physiological instrumentation.

I claim as my invention:

1. Sphygmomanometric apparatus comprising an occlusion cuff device adapted to extend around a body member and having opposite end portions, and means to slacken said cuff progressively through the relative systolic and diastolic points of the body member arteries, said slackening means comprising an electric motor and an associated drive connection movable by operation of said motor, said motor and drive connection being mounted on said cuff device and operatively interconnecting said end portions to move them progressively apart, and energizing circuit means connected to said motor, including switch means operable to control application of energizing voltage to the motor.

2. Sphygmomanometric apparatus comprising an occlusion cuff device adapted to extend around a body member and having opposite end portions, and means to tighten and slacken said cuff progressively through the relative sytolic and diastolic points of the body member arteries, said means comprising a reversible electric motor and an associated drive connection movable by operation of said motor, said motor and drive connection being mounted on said cuff device and operatively interconnecting said end portions to move them alternately together and apart, and energizing circuit means connected to said motor, including switch means operable to control application of energizing voltage to the motor selectively for operation thereof in either direction.

3. The apparatus defined in claim 2, wherein one end portion comprises a gear member, and the drive connection comprises a complemental gear member turned by the motor and meshing with the first gear member to tighten or slacken the cuff as the motor operates.

4. The apparatus defined in claim 2, and an electrical strain gauge mounted on the cuff device and adapted to produce a detectable electrical response variable with tension-induced strain in the cuff.

5. Sphygmomanometric apparatus comprising an occlusion cuff device adapted to extend around a body member and having opposite end portions, means to tighten and slacken said cuff progressively through the relative systolic and diastolic points of the body member arteries, said means comprising a reversible electric motor and an associated drive connection movable by operation of said motor, said motor and drive connection being mounted on said cuff device and operatively interconnecting said end portions to move them alternately together and apart, and energizing circuit means connected to said motor, including means operable to control application of energizing voltage to the motor selectively for operation thereof in either direction, and an electrical strain gauge mounted on the cuff device and adapted to produce a detectable electrical response variable with tension-induced strain in the cuff.

6. Sphygmomanometric apparatus comprising means including an interval timer and a reversible motor-driven occlusion cuff device controlled thereby to initiate tightening of the cuff device at predetermined intervals to occlude the arteries in a body member encircled by said cuff device and thereupon to progressively slacken the cuff after each such occlusion, and transducer means associated with said cuff device and operable to produce an electrical signal related to cuff tension.

7. Sphygmometric apparatus comprising a reversible motor-driven occlusion cuff device, an interval timer operatively connected to said cuff device to initiate tightening of the cuff around a body member at predetermined intervals, said cuff device being operable upon such initiation to progressively occlude an artery in such body member and thereupon to progressively slacken to remove such occlusion, transducer means responsively connected in the cuff device to produce an electrical output signal related to cuff tension, and means to indicate the magnitude of said signal.

References Cited in the file of this patent
UNITED STATES PATENTS

| | | |
|---|---|---|
| 2,714,379 | Raines | Aug. 2, 1955 |
| 2,756,741 | Campanella | July 31, 1956 |
| 2,826,191 | Burns | Mar. 11, 1958 |